United States Patent
Zheng et al.

(10) Patent No.: US 11,997,553 B2
(45) Date of Patent: May 28, 2024

(54) CELL CAMPING METHOD AND DEVICE

(71) Applicant: Huawei Technologies Co., Ltd., Shenzhen (CN)

(72) Inventors: Delai Zheng, Shenzhen (CN); Jianhua Yang, Shanghai (CN); Ao Guo, Shanghai (CN); Yongwang Cheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 358 days.

(21) Appl. No.: 17/431,583

(22) PCT Filed: Feb. 19, 2019

(86) PCT No.: PCT/CN2019/075497
§ 371 (c)(1),
(2) Date: Aug. 17, 2021

(87) PCT Pub. No.: WO2020/168471
PCT Pub. Date: Aug. 27, 2020

(65) Prior Publication Data
US 2022/0110032 A1    Apr. 7, 2022

(51) Int. Cl.
*H04W 36/00* (2009.01)
*H04W 52/02* (2009.01)

(52) U.S. Cl.
CPC . *H04W 36/0085* (2018.08); *H04W 36/00835* (2018.08); *H04W 36/00837* (2018.08); *H04W 52/0209* (2013.01)

(58) Field of Classification Search
None
See application file for complete search history.

(56) References Cited

U.S. PATENT DOCUMENTS

| | | | |
|---|---|---|---|
| 2013/0010763 A1 | 1/2013 | Chen et al. | |
| 2013/0016613 A1 | 1/2013 | Huang et al. | |
| 2016/0234747 A1 | 8/2016 | Fan et al. | |
| 2017/0055192 A1 | 2/2017 | Johansson et al. | |
| 2017/0078939 A1* | 3/2017 | Takahashi | H04W 36/24 |
| 2018/0035345 A1 | 2/2018 | Chockalingam et al. | |
| 2018/0242211 A1* | 8/2018 | Chen | H04W 36/38 |
| 2019/0320372 A1 | 10/2019 | Zhang et al. | |
| 2021/0377755 A1* | 12/2021 | Luo | H04W 24/04 |

FOREIGN PATENT DOCUMENTS

| | | |
|---|---|---|
| CN | 101064899 A | 10/2007 |
| CN | 101827407 A | 9/2010 |
| CN | 102014422 A | 4/2011 |
| CN | 102111787 A | 6/2011 |
| CN | 102131206 A | 7/2011 |
| CN | 102215526 A | 10/2011 |

(Continued)

*Primary Examiner* — Suhail Khan
(74) *Attorney, Agent, or Firm* — Conley Rose, P.C.

(57) ABSTRACT

A cell camping method and a terminal device selects a first cell having a quality of service reference value highest among cells found by the terminal device for current camping. When a quality of service reference value of the first cell is less than a first threshold, the terminal device sends a first measuring report or determines not to send a second measuring report such that the terminal device avoids performing cell handover.

20 Claims, 8 Drawing Sheets

(56) References Cited

FOREIGN PATENT DOCUMENTS

| | | | |
|---|---|---|---|
| CN | 102271358 | A | 12/2011 |
| CN | 102271360 | A | 12/2011 |
| CN | 102685855 | A | 9/2012 |
| CN | 102905288 | A | 1/2013 |
| CN | 102984774 | A | 3/2013 |
| CN | 103067991 | A | 4/2013 |
| CN | 106034312 | A | 10/2016 |
| CN | 107211469 | A | 9/2017 |
| CN | 108370516 | A | 8/2018 |
| CN | 109151930 | A | 1/2019 |

* cited by examiner

| Level (index) | 0 | 1 | 2 | 3 | 4 | 5 | 6 | 7 | 8 | 9 |
|---|---|---|---|---|---|---|---|---|---|---|
| Hz | 5 | 30 | 60 | 90 | 120 | 150 | 180 | 210 | 240 | 300 |
| Level (index) | 10 | 11 | 12 | 13 | 14 | 15 | 16 | 17 | 18 | 19 |
| Hz | 360 | 420 | 480 | 540 | 600 | 800 | 1000 | 1200 | 1500 | 1800 |

CELL CAMPING METHOD AND DEVICE

CROSS-REFERENCE TO RELATED APPLICATIONS

This application is a U.S. National Stage of International Patent Application No. PCT/CN2019/075497, filed on Feb. 19, 2019, which is hereby incorporated by reference in its entirety.

TECHNICAL FIELD

This application relates to the field of communications technologies, and in particular, to a cell camping method and a device.

BACKGROUND

Currently, in a long term evolution (long term evolution, LTE) network, when signal quality of a serving cell on which a terminal device camps is poor, the terminal device requests a network device to allocate, to the terminal device, a neighboring cell that needs to be measured and a measurement gap required for measuring the neighboring cell. After allocating the measurement gap and the neighboring cell to the terminal device, the network device notifies the terminal device of the allocated measurement gap and cell information of the allocated neighboring cell. Then, the terminal device performs cell measurement on the neighboring cell in the measurement gap allocated by the network device, and feeds back a measurement result to the network device. The network device selects, for the terminal device based on the measurement result, a target cell to which the terminal device can be handed over, so that the terminal device performs cell handover.

In some scenarios, a quality of service reference value of a neighboring cell allocated by the network device to the terminal device may not be high, or even lower than a quality of service reference value of a cell on which the terminal device currently camps (briefly referred to as a serving cell). However, according to an existing mechanism, even if the quality of service reference value of the serving cell on which the terminal device currently camps is greater than the quality of service reference value of the neighboring cell, and the terminal device actually does not need to perform cell handover, the terminal device is still triggered to request a neighboring cell and a measurement gap from the network device, and then perform cell measurement, provided that the quality of service reference value of the cell on which the terminal device camps is less than a specific threshold. In this case, the cell measurement affects performance of the terminal device. Consequently, power is wasted.

SUMMARY

This application provides a cell camping method and a device, to resolve problems in the conventional technology in which performance of a terminal device is affected and power is wasted because the terminal device may still perform cell measurement in a scenario in which there is no need to perform cell handover.

According to a first aspect, an embodiment of this application provides a terminal device. The terminal device includes a processor and a memory.

The memory stores code instructions.

The processor is configured to invoke the code instructions stored in the memory to perform the following operations:

selecting a cell whose quality of service reference value is highest from found cells as a first cell for current camping; and when a quality of service reference value of the first cell is less than a first threshold, reporting an event A1 or determining not to report an event A2.

In this embodiment of this application, because the first cell is the cell whose quality of service reference value is highest in the found cells, when the quality of service reference value of the first cell is less than the first threshold, the terminal device may report the event A1 or determine not to report the event A2, and may not perform cell handover. This can avoid power consumption caused to the terminal device because the terminal device needs to perform cell handover.

In a possible design, the first threshold may be configured by a network device, or may be a fixed value, for example, may be −90 dBm or −105 dBm.

In a possible design, the code instructions further include: before reporting the event A1 or determining not to report the event A2, determining that a preset condition is met, where the preset condition is used to indicate, to the terminal device, that the first cell is the cell whose quality of service reference value is highest in the cells found by the terminal device. Further, the preset condition is used to determine that the first cell is the cell whose quality of service reference value is highest in the cells found by the terminal device. This can ensure that the terminal device camps on a relatively good cell, ensure service continuity for the terminal device, and improve user experience.

In a possible design, the preset condition is at least one of the following:

the terminal device is located in a first area, a movement distance of the terminal device is not greater than a first distance, a movement range of the terminal device falls within a first range, and an interval between a measurement time point for a locally stored quality of service reference value of a neighboring cell and a current time point is not greater than first duration. A plurality of preset conditions are applicable to different states of the terminal device, and may be applied to different scenarios. Therefore, an application range can be effectively expanded.

In a possible design, the code instructions further include: stopping cell measurement after determining that the quality of service reference value of the first cell is less than the first threshold. That the terminal device stops cell measurement helps reduce power consumption.

In a possible design, when the event A1 is reported, a first measurement report may be sent to the network device, where the first measurement report is used to notify the network device that the quality of service reference value of the first cell is greater than the first threshold. The event A1 may be reported by sending the first measurement report. This ensures that the network device can learn a status of the quality of service reference value of the first cell in a timely manner.

In a possible design, during sending of the first measurement report to the network device, the quality of service reference value of the first cell may be first modified, so that a modified quality of service reference value of the first cell is greater than the first threshold; and then the first measurement report that carries the modified quality of service reference value of the first cell is sent to the network device.

Reporting of the event A1 can be triggered by modifying the quality of service reference value of the first cell, and the first measurement report may carry the modified quality of service reference value of the first cell, so that the network device can explicitly determine that the quality of service reference value of the first cell is greater than the first threshold.

In a possible design, the determining not to report an event A2 may be determining not to send a second measurement report to the network device, where the second measurement report is used to notify the network device that the quality of service reference value of the first cell is less than the first threshold. In this manner, the second measurement report is not sent, so that the network device does not allocate a measurement gap. In this way, the terminal device can be prevented from performing cell measurement, and power consumption can be reduced.

In a possible design, the code instructions further include: sending a first message to the network device after determining that the quality of service reference value of the first cell is less than the first threshold, where the first message is used to indicate that the terminal device meets the preset condition. In this manner, the first message is sent, so that the network device can explicitly learn a status of the terminal device and the network device does not allocate a measurement gap. In this way, the terminal device can be prevented from performing cell measurement, and power consumption can be reduced.

In a possible design, the first message includes location information of the terminal device. The network device can be explicitly notified of the location information of the terminal device, to perform a related operation.

According to a second aspect, an embodiment of this application provides a cell camping method, including:

A terminal device selects a cell whose quality of service reference value is highest from cells found by the terminal device as a first cell for current camping.

When a quality of service reference value of the first cell is less than a first threshold, the terminal device reports an event A1 or determines not to report an event A2.

In a possible design, before the terminal device reports the event A 1 or determines not to report the event A2, the terminal device may determine that a preset condition is met, where the preset condition is used to indicate, to the terminal device, that the first cell is the cell whose quality of service reference value is highest in the cells found by the terminal device.

In a possible design, the preset condition is at least one of the following:
  the terminal device is located in a first area, a movement distance of the terminal device is not greater than a first distance, a movement range of the terminal device falls within a first range, and an interval between a measurement time point for a locally stored quality of service reference value of a neighboring cell and a current time point is not greater than first duration.

In a possible design, after the terminal device determines that the quality of service reference value of the first cell is less than the first threshold, the terminal device may stop cell measurement.

In a possible design, when reporting the event A1, the terminal device may send a first measurement report to the network device, where the first measurement report is used to notify the network device that the quality of service reference value of the first cell is greater than the first threshold.

In a possible design, when the terminal device sends the first measurement report to the network device, the terminal device may first modify the quality of service reference value of the first cell, where a modified quality of service reference value of the first cell is greater than the first threshold; and then send, to the network device, the first measurement report that carries the modified quality of service reference value of the first cell.

In a possible design, when determining not to report the event A2, the terminal device may determine not to send a second measurement report to the network device, where the second measurement report is used to notify the network device that the quality of service reference value of the first cell is less than the first threshold.

In a possible design, after determining that the quality of service reference value of the first cell is less than the first threshold, the terminal device may further send a first message to the network device, where the first message is used to indicate that the terminal device meets the preset condition.

In a possible design, the first message includes location information of the terminal device.

According to a third aspect, an embodiment of this application provides a chip. The chip includes a processor and an interface.

The interface is configured to: receive code instructions, and send the received code instructions to the processor.

The processor is configured to run the received code instructions sent by the interface, to perform the following operations:
  selecting a cell whose quality of service reference value is highest from cells found by the terminal device as a first cell for current camping; and
  when a quality of service reference value of the first cell is less than a first threshold, reporting an event A1 or determining not to report an event A2.

In a possible design, the first threshold may be configured by a network device, or may be a fixed value, for example, may be −90 dBm or −105 dBm.

In a possible design, the code instructions further include: before reporting the event A1 or determining not to report the event A2, determining that a preset condition is met, where the preset condition is used to indicate, to the terminal device, that the first cell is the cell whose quality of service reference value is highest in the cells found by the terminal device.

In a possible design, the preset condition is at least one of the following:
  the terminal device is located in a first area, a movement distance of the terminal device is not greater than a first distance, a movement range of the terminal device falls within a first range, and an interval between a measurement time point for a locally stored quality of service reference value of a neighboring cell and a current time point is not greater than first duration.

In a possible design, the code instructions further include: stopping cell measurement after determining that the quality of service reference value of the first cell is less than the first threshold.

In a possible design, when reporting the event A1, a first measurement report may be sent to the network device, where the first measurement report is used to notify the network device that the quality of service reference value of the first cell is greater than the first threshold.

In a possible design, during sending of the first measurement report to the network device, the quality of service reference value of the first cell may be first modified, so that a modified quality of service reference value of the first cell is greater than the first threshold; and then the first measurement report that carries the modified quality of service reference value of the first cell is sent to the network device.

In a possible design, the determining not to report an event A2 may be determining not to send a second measurement report to the network device, where the second measurement report is used to notify the network device that the quality of service reference value of the first cell is less than the first threshold.

In a possible design, the code instructions further include: sending a first message to the network device after determining that the quality of service reference value of the first cell is less than the first threshold, where the first message is used to indicate that the terminal device meets the preset condition.

In a possible design, the first message includes location information of the terminal device.

According to a fourth aspect, an embodiment of this application further provides a computer storage medium. The computer storage medium stores program instructions. The program instructions are run on an electronic device, to implement the method provided in any one of the first aspect or the designs in the first aspect.

In addition, for technical effects implemented in any possible design manner in the second aspect to the fourth aspect, refer to the technical effects implemented in the different design manners in the related apparatus part. Details are not described herein again.

DESCRIPTION OF EMBODIMENTS

This application provides a cell camping method and a device, to resolve problems in the conventional technology in which performance of a terminal device is affected and power is wasted because the terminal device may still perform cell measurement in a scenario in which there is no need to perform cell handover. The method and the apparatus in this application are based on a same inventive concept. Because a problem-resolving principle of the method is similar to that of the apparatus, mutual reference may be made between an implementation of the apparatus and an implementation of the method. Repeated parts are not described in detail again.

It should be understood that, in descriptions of this application, the terms such as "first", "second", and "third" are merely used for differentiation and description, but cannot be understood as an indication or implication of relative importance or an indication or implication of an order.

Figure 1:
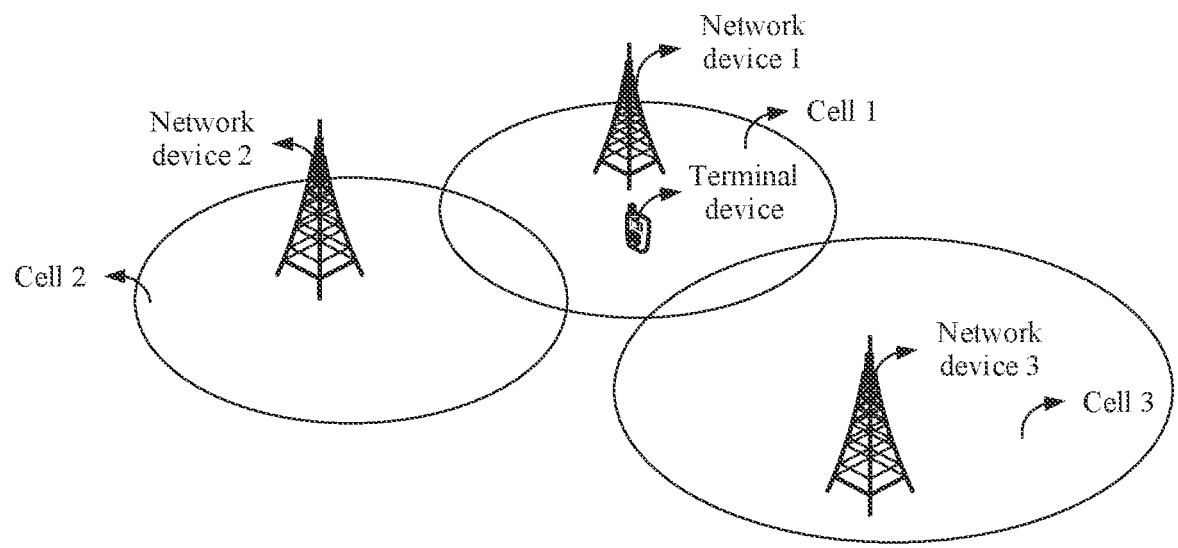
FIG. 1 is a schematic diagram of an application scenario according to an embodiment of this application.
Figure 2:
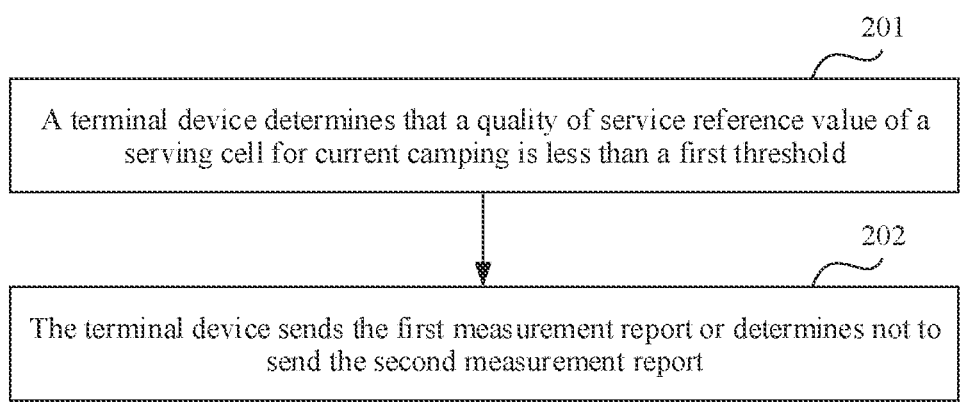
FIG. 2 is a schematic diagram of a cell camping method according to an embodiment of this application.

FIG. 1 is a schematic diagram of a scenario applicable to the embodiments of this application. In this scenario, a network device and a terminal device are included.

The terminal device in this application may also be referred to as user equipment (user equipment, UE). The terminal device may be deployed on land, including an indoor device, an outdoor device, a handheld device, or a vehicle-mounted device, may be deployed on a water surface (for example, on a ship), or may be deployed in the air (for example, on an aircraft, a balloon, or a satellite). The terminal device may be a mobile phone (mobile phone), a tablet computer (pad), a computer having a wireless transceiver function, a virtual reality (virtual reality, VR) terminal, an augmented reality (augmented reality, AR) terminal, a wireless terminal in industrial control (industrial control), a wireless terminal in self-driving (self-driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like.

The network device is a device that provides a wireless communication function for the terminal device, and includes but is not limited to a base station, a next generation NodeB (next generation NodeB, gNB) in 5G, and an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), a transmission reception point (transmitting and receiving point, TRP), a transmission point (transmitting point, TP), a mobile switching center, and the like.

There may usually be a plurality of network devices near the terminal device. The terminal device may select a cell as a serving cell based on quality of service reference values (for example, signal quality) of cells in which the network devices are located. Quality of service reference values of cells in which different network devices are located may be different. The terminal device should camp on a cell with a relatively high quality of service reference value. As shown in FIG. 1, there are three network devices: a network device 1, a network device 2, and a network device 3. The terminal device camps on a cell 1 in which the network device 1 is located. The cell 1 is a serving cell of the terminal device. A cell 2 in which the network device 2 is located and a cell 3 in which the network device 3 is located are adjacent to the cell 1, and are neighboring cells of the cell 1.

To ensure that the terminal device can always camp on the cell with the relatively high quality of service reference value, the terminal device may send a measurement report to the network device, to notify the network device of a relationship between a quality of service reference value of the current serving cell and an absolute threshold, and enable or disable cell measurement. A specific process is as follows:

Event A1 (event A1): The quality of service reference value of the serving cell is greater than or equal to a first threshold. The terminal device may notify, by using a first measurement report, the network device that the quality of service reference value of the serving cell of the terminal device is greater than or equal to the first threshold, namely, report the event A1 to the network device, to stop the cell measurement. After the network device receives the first measurement report, the network device may deactivate a measurement gap that is previously allocated to the terminal device and that is used to perform the cell measurement.

Event A2 (event A2): The quality of service reference value of the serving cell is less than a first threshold. The terminal device may notify, by using a second measurement report, the network device that the quality of service reference value of the serving cell of the terminal device is less than the first threshold, namely, report the event A2 to the network device. After the network device receives the second measurement report, the network device may allocate, to the terminal device, a measurement gap and a neighboring cell that are used to perform cell measurement; and the terminal device obtains the measurement gap from the network device, to perform the cell measurement.

It should be noted that the cell measurement related to the foregoing events is measurement of an inter-frequency cell, an inter-system cell, or an inter-frequency inter-system cell. For an intra-frequency intra-system cell, the terminal device may perform cell measurement on the intra-frequency intra-system cell based on information that is about the measured and controlled cell and that is pre-sent by the network device. When performing cell measurement on the inter-frequency cell, the inter-system cell, or the inter-frequency inter-system cell, the terminal device simultaneously enables cell measurement of the intra-frequency intra-system cell.

The intra-frequency intra-system cell is a cell that has a same frequency band and belongs to a same system as the serving cell. The inter-frequency cell is a cell that has a frequency band different from a frequency band of the serving cell. The inter-system cell is a cell that belongs to a system different from a system to which the serving cell belongs. The inter-frequency inter-system cell is a cell that has a frequency band different from a frequency band of the serving cell and that belongs to a system different from a system to which the serving cell belongs. The system herein includes but is not limited to an evolved universal mobile telecommunications system terrestrial radio access (evolved universal mobile telecommunications system terrestrial radio access, eUTRAN) system, a frequency division duplexing (frequency division duplexing, FDD) system, a time division duplexing (time division duplexing, TDD) system, a UMTS terrestrial radio access network (UMTS terrestrial radio access network, UTRAN) system, a GSM radio access network (GSM/EDGE radio access network, GERAN) system, a code division multiple access (code division multiple access, CDMA) system, or the like.

The global system for mobile communications (GSM) is a global mobile communications system, and EDGE (enhanced data rate for GSM evolution) is an enhanced data rate GSM evolution technology.

The schematic diagram of the scenario shown in FIG. 1 is used as an example to describe a manner for the terminal device to determine the serving cell. When the terminal device enters a range of the cell 1 for the first time or needs to re-access the cell (for example, the terminal device is powered on, restarted, or performs network reselection), the terminal device searches for surrounding cells and performs measurement. In other words, the terminal device measures the cell 1 and neighboring cells of the cell 1 (the neighboring cells of the cell 1 are the cell 2 and the cell 3), determines quality of service reference values of the cell 1, the cell 2, and the cell 3, compares the quality of service reference values of the cell 1, the cell 2, and the cell 3, and selects a cell whose quality of service reference value is highest from the cell 1, the cell 2, and the cell 3 as the serving cell. For example, the cell 1 has the highest quality of service reference value. The terminal device selects the cell 1 as the serving cell, and camps on the cell 1.

In a possible implementation, the terminal device may alternatively manually select a network. For example, the terminal device may alternatively manually select a cell whose quality of service reference value is highest from the cells as the serving cell.

If the terminal device finds, through measurement, that quality of service of the serving cell on which the terminal device currently camps becomes poor, and that the quality of service reference value of the serving cell is less than the first threshold (which may also be referred to as an absolute threshold), the terminal device reports the event A2 to the network device, to request the network device to allocate the measurement gap and the neighboring cells. After performing the cell measurement on the neighboring cells in the measurement gap, the terminal device feeds back a measurement result to the network device. The network device selects, for the network device based on the measurement result, a neighboring cell with a relatively high quality of service reference value, and controls, based on the selected neighboring cell, the terminal device to perform cell handover.

After performing the cell measurement, the terminal device may directly send the measurement result to the network device, or may send the measurement result to the network device after meeting a specific reporting condition (for example, a quality of service reference value of a measured neighboring cell is greater than a preset value). The network device determines whether cell handover is required. If cell handover is required, the network device selects a neighboring cell for the terminal device.

Actually, after performing the cell measurement, the terminal device may find that the quality of service reference value of the measured neighboring cell is not greater than the quality of service reference value of the serving cell on which the terminal device currently camps. However, based on an existing method, the terminal device requests a measurement gap and a neighboring cell from the network device and then performs the cell measurement, provided that the quality of service reference value of the serving cell on which the terminal device currently camps is less than the first threshold. In this case, the terminal device actually does not need to perform cell handover, perform the cell measurement, or request the measurement gap and the neighboring cell from the network device. The unnecessary cell measurement inevitably increases power consumption of the terminal device, and occupies a resource of the terminal device. In addition, during the cell measurement, the terminal device cannot provide good user experience for a user.

An embodiment of this application provides a cell camping method, to avoid a resource waste caused because a terminal device needs to perform cell measurement even if the terminal device does not need to perform cell handover. The method includes the following steps:

Step 201: The terminal device determines that a quality of service reference value of a serving cell for current camping is less than a first threshold, where the first threshold may be notified by a network device to the terminal device, or may be locally configured by the terminal device. This is not limited in this embodiment of this application. The first threshold may be −90 decibel-milliwatts (dBm) or −105 dBm.

Step 202: The terminal device sends the first measurement report or determines not to send the second measurement report.

It should be noted that an example in which both a threshold in an event A1 and a threshold in an event A2 each are a first threshold is used for description in this embodiment of this application. In a possible implementation, the threshold in the event A1 and the threshold in the event A2 may alternatively be different. For example, the threshold in the event A1 is a threshold 1 (for example, may be −90 dBm), and the threshold in the event A2 is a threshold 2 (for example, may be −105 dBm). If the quality of service reference value of the serving cell is greater than or equal to the threshold 1, the event A1 is reported. If the quality of service reference value of the serving cell is less than the threshold 2, the event A2 is reported. A case in which the thresholds are different is similar to a case in which the thresholds are the same; and in an information sending method provided in this embodiment of this application, only the first threshold needs to be adjusted to the threshold in the corresponding event (the event A1 or the event A2). Details are not described herein.

The terminal device may periodically measure the quality of service reference value of the serving cell, and compare the quality of service reference value with the first threshold. Alternatively, the terminal device may measure the quality of service reference value of the serving cell in a specific time period. For example, the terminal device may select a time period in which a relatively small amount of information is being exchanged, for example, a time period in the early morning or in the midnight, to measure the quality of service reference value of the serving cell.

The quality of service reference value of the serving cell is a parameter of the serving cell. A specific representation form of the quality of service reference value of the serving cell is not limited in this embodiment of this application. Any parameter that can reflect quality of service of the serving cell may be used as the quality of service reference value of the serving cell. For example, the quality of service reference value of the serving cell may be some or all of the following parameters: signal quality, a packet loss rate, reference signal received power (reference signal receiving power, RSRP), reference signal received quality (reference signal receiving quality, RSRQ), a signal delay, a signal jitter, and a signal bit error rate that are of the serving cell. Alternatively, the quality of service reference value of the serving cell may be a value obtained by performing a specific operation on the foregoing parameter. For example, the quality of service reference value of the serving cell may be an R value. The R value is a sum of the RSRP of the serving cell and a first specified value, and the first specified value may be $Q_{hyst}$ that is a fixed value. For another example, the quality of service reference value of the serving cell may be an S value. The S value is a difference between the RSRP of the serving cell and a second specified value, the first specified value may be $Q_{relevmin}+Q_{relevminoffset}+P_{compensation}$, where $Q_{relevmin}$ represents minimum received strength of the RSRP of the serving cell, $Q_{relevminoffset}$ represents an estimated offset, and $P_{compensation}$ represents a maximum difference between maximum uplink transmit power allowed for the terminal device in the serving cell and maximum uplink transmit power of the terminal device.

If the quality of service reference value of the serving cell is less than the first threshold, it indicates that the quality of service of the serving cell is relatively poor. However, when last selecting the serving cell, the terminal device has measured the serving cell (corresponding to the cell 1 in FIG. 1) and the neighboring cells (corresponding to the cell 2 and the cell 3 in FIG. 1), and has selected the cell 1 whose quality of service reference value is highest as the serving cell. When the quality of service reference value of the serving cell is less than the first threshold, it indicates that quality of service reference values of the neighboring cells are not greater than the first threshold either. In this case, the terminal device does not need to perform cell handover, and the terminal device may directly send the first measurement report, namely, report the event A1, to notify the network device that the quality of service reference value of the serving cell is greater than the first threshold. This prevents the network device from continuing to allocate a neighboring cell and a measurement gap to the terminal device. Alternatively, the terminal device may stop cell measurement. Alternatively, the terminal device may not trigger the second measurement report, namely, may not report the event A2, so that the network device does not need to continue to allocate a neighboring cell and a measurement gap to the terminal device.

Figure 3:
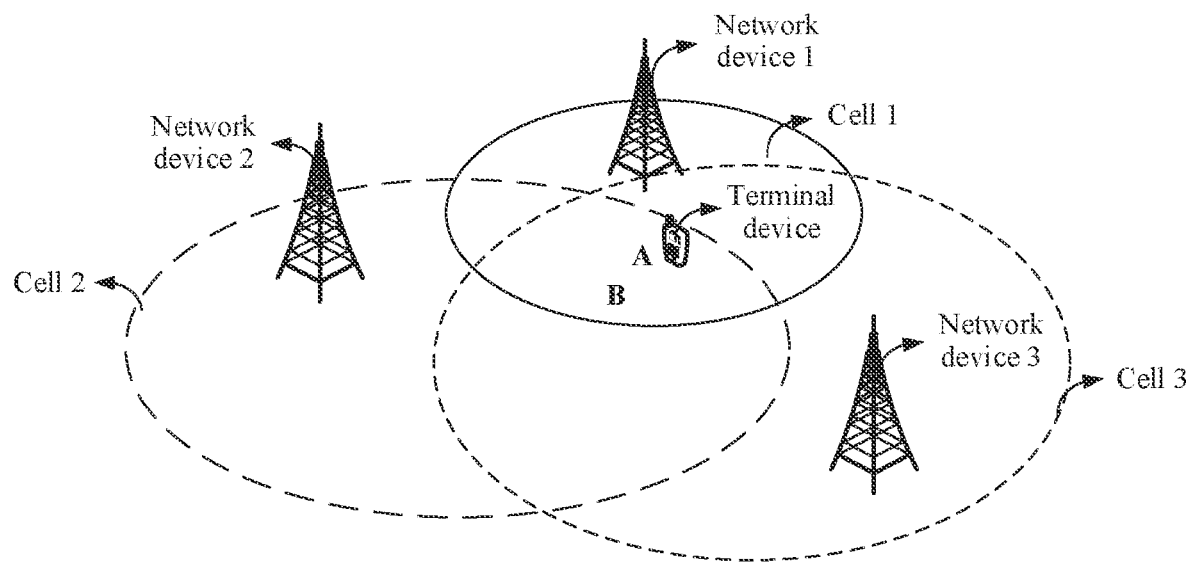
FIG. 3 is a schematic diagram of a location relationship between cells according to an embodiment of this application.

A location of the terminal device in the serving cell does not remain unchanged. However, the terminal device may move, and the terminal device may be located at different locations in the serving cell. If the terminal device performs the cell measurement, quality of service reference values that are of the neighboring cells and that are measured by the terminal device may also be different. The quality of service reference value of the serving cell on which the terminal device currently camps and the quality of service reference values of the neighboring cells may be different from the quality of service reference values that have been measured during initial selection of the serving cell. As shown in FIG. 3, a serving cell in which the terminal device is currently located is a cell 1 in which the network device 1 is located, and neighboring cells allocated by the network device 1 to the terminal device are a cell 2 in which a network device 2 is located and a cell 3 in which a network device 3 is located. For the cell 2, when the terminal device moves from a location A to a location B, the terminal device moves from an edge area of the cell 2 to a central area of the cell 2, and a quality of service reference value that is of the cell 2 and that is detected by the terminal device at the location A is less than a quality of service reference value that is of the cell 2 and that is detected by the terminal device at the location B. For the cell 3, when the terminal device moves from the location A to the location B, the terminal device keeps being located in a central area of the cell 3, and a difference between a quality of service reference value that is of the cell 3 and that is detected by the terminal device at the location A and a quality of service reference value that is of the cell 3 and that is detected by the terminal device at the location A is relatively small. In a specific allowable range, it may be considered that the quality of service reference value that is of the cell 3 and that is detected by the terminal device at the location A is basically the same as the quality of service reference value that is of the cell 3 and that is detected by the terminal device at the location A.

A preset condition may be set, to ensure that the quality of service reference value of the serving cell on which the terminal device currently camps is optimal. Before sending the first measurement report or determining not to send the second measurement report, the terminal device may determine whether the preset condition is met. When the preset condition is met, the terminal device sends the first measurement report or determines not to send the second measurement report.

For example, the preset condition may be at least one of the following:

the terminal device is located in a first area, a movement distance of the terminal device is not greater than a first distance, a movement range of the terminal device falls within a first range, and an interval between a measurement time point for a locally stored quality of service reference value of a neighboring cell and a current time point is not greater than first duration.

The following separately describes the foregoing four preset conditions:

1. The terminal device is located in the first area.

The first area may be set in the serving cell. When the terminal device is located in the first area, the terminal device has performed cell measurement and selected the cell 1 as the serving cell. Then, if the terminal device moves but does not move outside the first area, it may be considered that a quality of service reference value that is of a neighboring cell and that has been measured by the terminal device at any location in the first area is the same as a quality of service reference value that is of the neighboring cell and that is measured by the terminal device at any location in the first area. Alternatively, if a difference between a quality of service reference value that is of a neighboring cell and that has been measured by the terminal device at any location in the first area and a quality of service reference value that is of the neighboring cell and that is measured by the terminal device at any location falls within an allowable error range, it may be considered that the quality of service reference value that is of the neighboring cell and that has been measured by the terminal device at any location in the first area is basically the same as the quality of service reference value that is of the neighboring cell and that is measured by the terminal device at any location.

When the terminal device is located in the first area, it may be considered that the serving cell is a cell whose quality of service reference value is highest.

In another possible implementation, the terminal device may alternatively compare the quality of service reference value of the serving cell with the quality of service reference value of the neighboring cell, to determine that the quality of service reference value of the serving cell is not less than the quality of service reference value of the neighboring cell.

The terminal device may locally store a quality of service reference value that is of a neighboring cell and that has been measured during previous cell measurement. For example, each time the terminal device performs cell measurement on the neighboring cell, the terminal device may store a quality of service reference value that is of the neighboring cell and that is measured by the terminal device. Alternatively, after performing cell measurement on a neighboring cell, the terminal device may delete a previously stored quality of service reference value of the neighboring cell, and store a quality of service reference value that is of the neighboring cell and that is measured during the current cell measurement. In other words, the terminal device may store only a quality of service reference value that is of the neighboring cell and that is last measured by the terminal device. The foregoing manner for the terminal device to locally store the quality of service reference value that is of the neighboring cell and that has been measured during the previous cell measurement is merely used an example for description, and is not limited in this embodiment of this application. Any manner that can be used to locally store the quality of service reference value that is of the neighboring cell and that has been measured during the previous cell measurement is applicable to this embodiment of this application.

After determining that the quality of service reference value of the serving cell for current camping is less than the first threshold, the terminal device first determines whether the terminal device has previously measured the quality of service reference value of the neighboring cell and whether the terminal device has locally stored the quality of service reference value that is of the neighboring cell and that has been previously measured by the terminal device. If the terminal device has stored the quality of service reference value that is of the neighboring cell and that has been previously measured by the terminal device, the terminal device may compare the locally stored quality of service reference value of the neighboring cell with the quality of service reference value of the serving cell. The locally stored quality of service reference value of the neighboring cell is used. Therefore, a process in which the terminal device performs cell measurement is omitted, and processing resources of the terminal can be effectively reduced.

The first area may alternatively be considered as an area in which the quality of service reference value that is of the neighboring cell and that has been locally stored by the terminal device is valid.

Figure 4A:
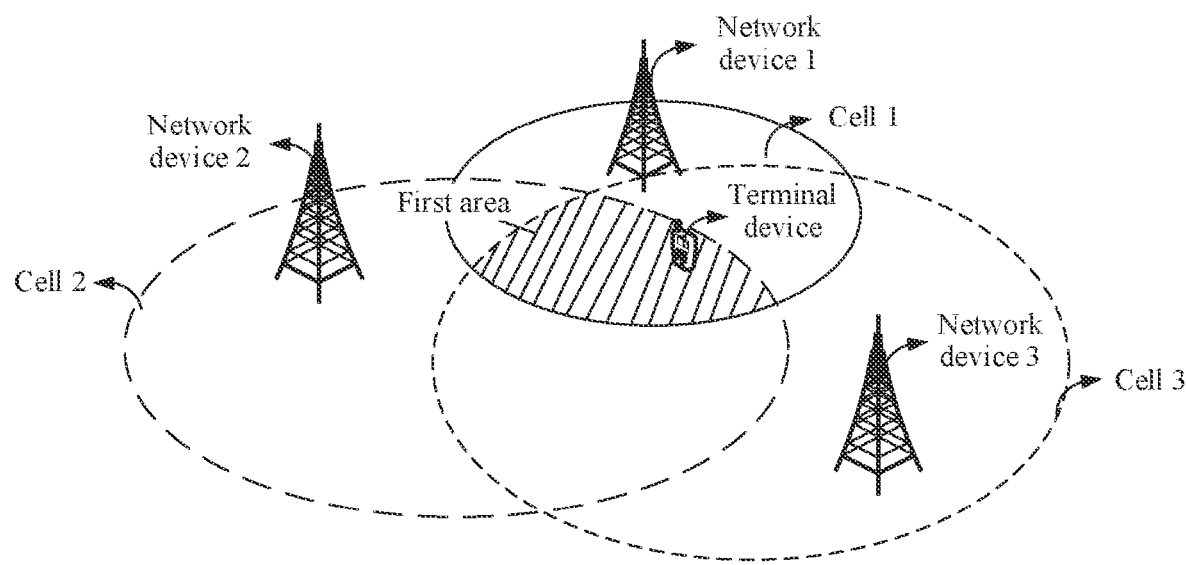
FIG. 4A and FIG. 4B are a first schematic diagram and a second schematic diagram of a first area in a cell according to an embodiment of this application.

As shown in FIG. 4A, a serving cell in which the terminal device is currently located is a cell 1 in which the network device 1 is located, and neighboring cells allocated by the network device 1 to the terminal device are a cell 2 in which a network device 2 is located. An overlapping area of the cell 1, the cell 2, and the cell 3 may be set as the first area. If the terminal device is located in the first area, it may be considered that a quality of service reference value that is of the neighboring cell 2 and that has been measured at any location in the first area or locally stored by the terminal device is the same as a quality of service reference value that is of the neighboring cell 2 and that is temporarily measured by the terminal device at any location.

Figure 4B:
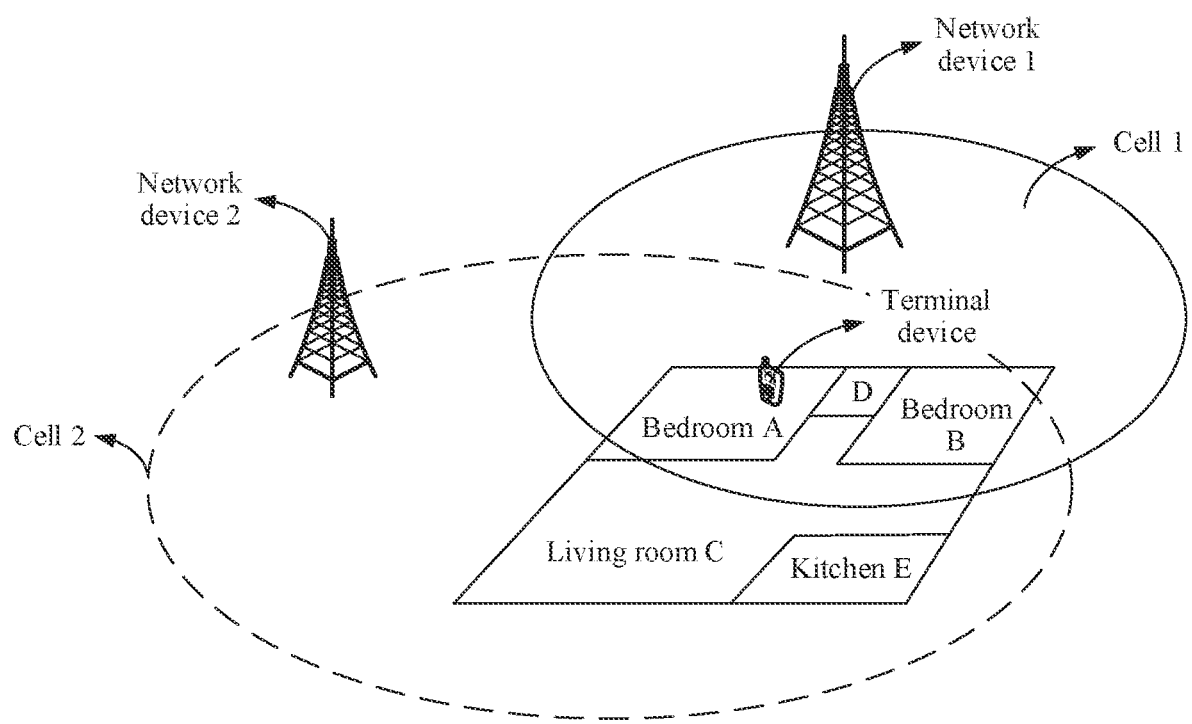

As shown in FIG. 4B, a serving cell in which the terminal device is currently located is a cell 1 in which the network device 1 is located, and a neighboring cell allocated by the network device 1 to the terminal device is a cell 2 in which a network device 2 is located.

The terminal device is currently located in a house. The house includes a bedroom A, a bedroom B, a living room C, a bathroom D, and a kitchen E. The bedroom A, the bedroom B, and the bathroom D may be set as the first area. If the terminal device is located in the first area, it may be considered that a quality of service reference value that is of the neighboring cell 2 and that has been measured or locally stored by the terminal device is the same as a quality of service reference value that is of the neighboring cell 2 and that is temporarily measured by the terminal device at a current location. If the terminal device is located in the living room C or the kitchen E, because an area in which the living room C is located falls beyond a range of the cell 1, the quality of service reference value that is of the neighboring cell 2 and that has been locally stored by the terminal device may be different from a quality of service reference value that is of the neighboring cell 2 and that is measured by the terminal device in the living room C.

The first area may be determined based on a relative location between the serving cell in which the terminal device is located and the neighboring cell. The first area may be preconfigured by the network device and notified to the terminal device, or may be configured on the terminal device by another device.

A representation manner of the first area is not limited in this embodiment of this application. For example, the first area may be represented by a part of or an entire longitude and latitude area or a part of or an entire area in a time zone, a city, a street, a shop, or a building.

The terminal device may determine, based on current location information, whether the terminal device is located in the first area. The current location information of the terminal device may be determined by a general packet radio service (general packet radio service, GPRS) server, may be determined by using a location method such as a Bluetooth location method or a wireless fidelity (wireless fidelity, Wi-Fi) location method, or may be determined by using a location method in which a barometer and a gyroscope of a mobile phone is used. Any manner that can be used to determine the current location information of the terminal device is applicable to this embodiment of this application.

If the terminal device is not located in the first area, the terminal device may report the event A2 to the network device in an existing manner, to perform cell measurement.

2. The movement distance of the terminal device is not greater than the first distance.

The terminal device does not keep stationary at any moment and may move in a relatively small range. When the terminal device has performed cell measurement before moving or in a moving process, and selected the cell 1 as the serving cell, if the terminal device then moves at a relatively short distance, and the movement distance is not greater than the first distance, it may be considered that a difference between a quality of service reference value that is of a neighboring cell and that is measured by the terminal device before moving or in the movement process and a quality of service reference value that is of the neighboring cell and that is measured by the terminal device in a subsequent movement process falls within a specific allowable error range. In this case, both the quality of service reference values may be considered to be the same, and it may be further determined that the serving cell is a cell whose quality of service reference value is highest.

Similar to the condition 1, the terminal device may also compare the quality of service reference value of the serving cell with a quality of service reference value of the neighboring cell, for example, determine, based on a locally stored quality of service reference value of the neighboring cell, that the quality of service reference value of the serving cell is not less than the quality of service reference value of the neighboring cell. A specific process is similar to the manner in the condition 1, and details are not described herein again.

Figure 4C:
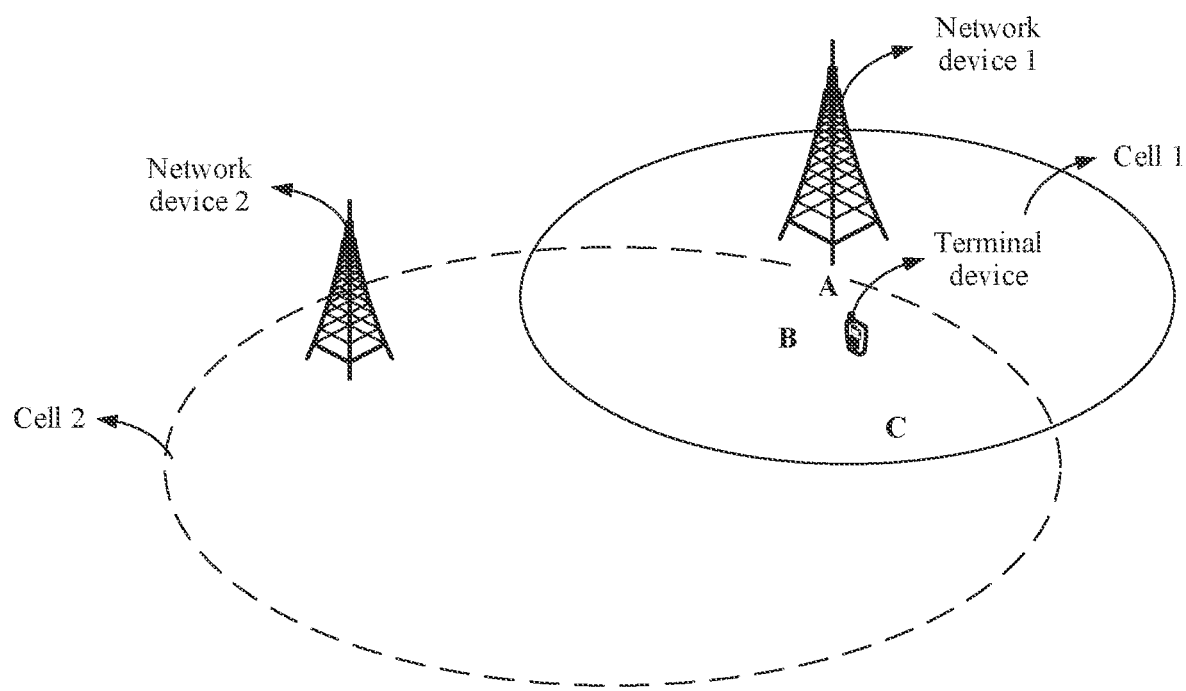
FIG. 4C and FIG. 4D are a first schematic diagram and a second schematic diagram of a movement distance of a terminal device according to an embodiment of this application.
Figure 4D:
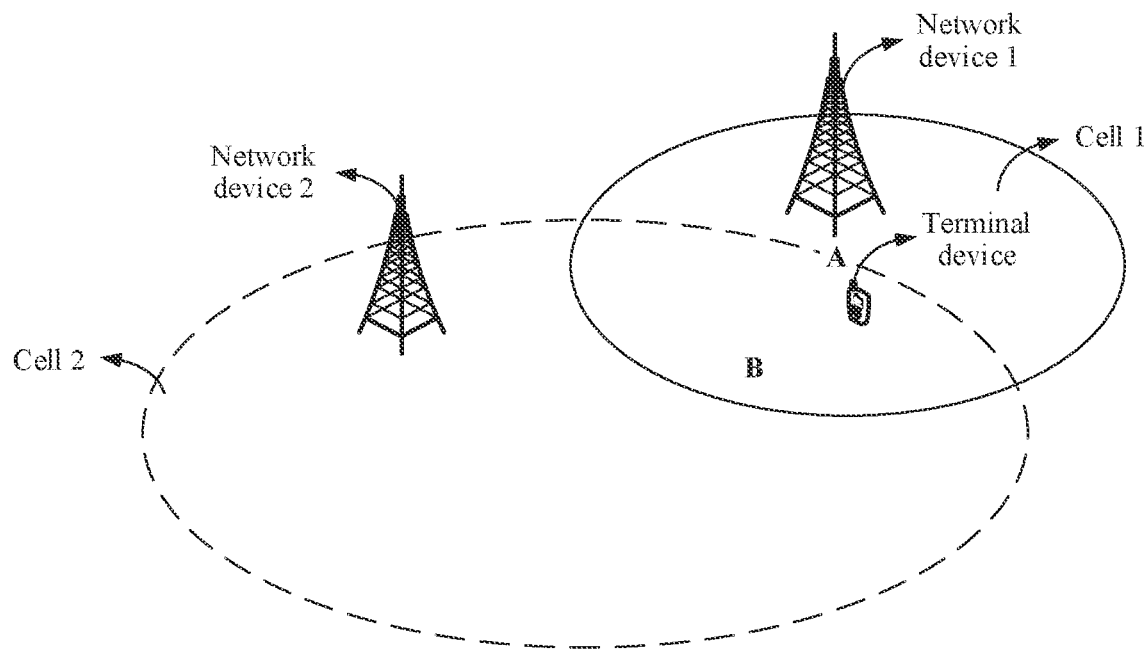

As shown in FIG. 4C, a serving cell in which the terminal device is currently located is a cell 1 in which the network device 1 is located, the terminal device is located at a point A, and a neighboring cell allocated by the network device 1 to the terminal device is a cell 2 in which a network device 2 is located. The terminal device may move from the point A to a point B in the cell 1, or may move from the point A to a point C in the cell 1.

A straight-line distance for the terminal device to move from the point A to the point B in the cell 1 is 5 meters, and a straight-line distance for the terminal device to move from the point A to the point C in the cell 1 is 10 meters. If the first distance is 6 meters, because the straight-line distance for the terminal device to move from the point A to the point B in the cell 1 is less than the first distance, it may be considered that a difference between a quality of service reference value that is of the neighboring cell and that has been measured at the point A or locally stored by the terminal device and a quality of service reference value that is of the neighboring cell and that is measured by the terminal device at any point on a straight line from the point A to the point B falls within an allowable error range. In this case, both the quality of service reference values are considered to be basically the same. The straight-line distance for the terminal device to move from the point A to the point C in the cell 1 is greater than the first distance. It may be considered that a difference between a quality of service reference value that is of the neighboring cell and that is measured by the terminal device at the point A and a quality of service reference value that is of the neighboring cell and that is measured by the terminal device at the point C is relatively large. In this case, both the quality of service reference values cannot be considered to be the same.

In FIG. 4C, the first distance is a straight-line distance, and the first distance may alternatively be a movement distance of the terminal device. Any manner that can be used to indicate the distance is applicable to this embodiment of this application. This is not limited in this embodiment of this application.

A value of the first distance may be determined based on a location of the terminal device and a relative location between the serving cell in which the terminal device is located and the neighboring cell. Different locations of the terminal device may correspond to different first distances. For example, if the terminal device is located in a central area of the serving cell in which the terminal device is located, the corresponding first distance may be set to a relatively large value: and if the terminal device is located in an edge area of the serving cell in which the terminal device is located, the corresponding first distance may be set to a relatively small value.

As shown in 4D, a serving cell in which the terminal device is currently located is a cell 1 in which the network device 1 is located, a neighboring cell allocated by the network device to the terminal device is a cell 2 in which a network device 2 is located, and the terminal device may be located at a point A, or may be located at a point B. The point A is located in a central area of the cell 1, and a relatively large movement distance of the terminal device does not cause great impact on a quality of service reference value that is of the neighboring cell 2 and that is measured by the terminal device. Therefore, the first distance corresponding to the terminal device at the point A may be set to 10 meters. The point B is located in an edge area of the cell 1, and when a movement distance of the terminal device is relatively large, the terminal device may move out of the cell 1. This causes great impact on the quality of service reference value that is of the neighboring cell and that is measured by the terminal device. Therefore, the first distance corresponding to the terminal device at the point B may be set to 5 meters.

The first distance may be preconfigured by the network device and notified to the terminal device, or may be configured on the terminal device by another device.

3. The movement range of the terminal device falls within the first range.

When the terminal device moves, the terminal device may not move longer than a specific distance, but may move continuously within a range. When the terminal device moves within a relatively small range that does not exceed the first range, and the terminal device has performed cell measurement at an original location, and selected the cell 1 as the serving cell, if the terminal device then moves within the first range, it may be considered that a difference between a quality of service reference value that is of a neighboring cell and that is measured by the terminal device at the original location and a quality of service reference value that is of the neighboring cell and that is measured by the terminal device in a process of moving within the first range falls within a specific allowable error range. In this case, both the quality of service reference values may be considered to be the same, and it may be further determined that the serving cell is a cell whose quality of service reference value is highest.

Similar to the condition 1, the terminal device may also compare the quality of service reference value of the serving cell with a quality of service reference value of the neighboring cell, for example, determine, based on a locally stored quality of service reference value of the neighboring cell, that the quality of service reference value of the serving cell is not less than the quality of service reference value of the neighboring cell. A specific process is similar to the manner in the condition 1, and details are not described herein again.

Different from the first area in the condition 1 in which the first area is a fixed area delineated in the serving cell, the first range in the condition 3 is related to a movement location of the terminal device, and may be an area range delineated by using a location of the terminal device as a starting point. In other words, the first range may be flexibly changed. For example, the first range is set as a circle whose center is a measurement point for the quality of service reference value that is of the neighboring cell and that has been locally stored by the terminal device, or set as a regular or irregular area range that is centered on a measurement point for the quality of service reference value that is of the neighboring cell and that has been locally stored by the terminal device.

Figure 4E:
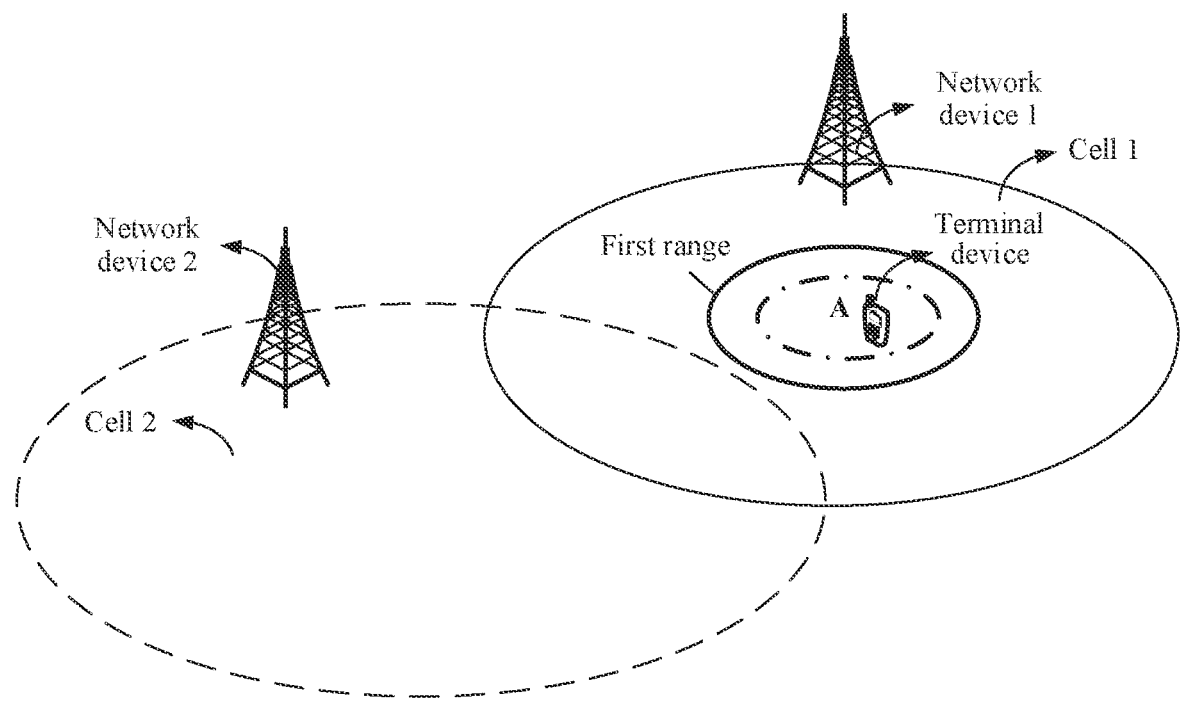
FIG. 4E and FIG. 4F are a first schematic diagram and a second schematic diagram of a movement range of a terminal device according to an embodiment of this application.
Figure 4F:
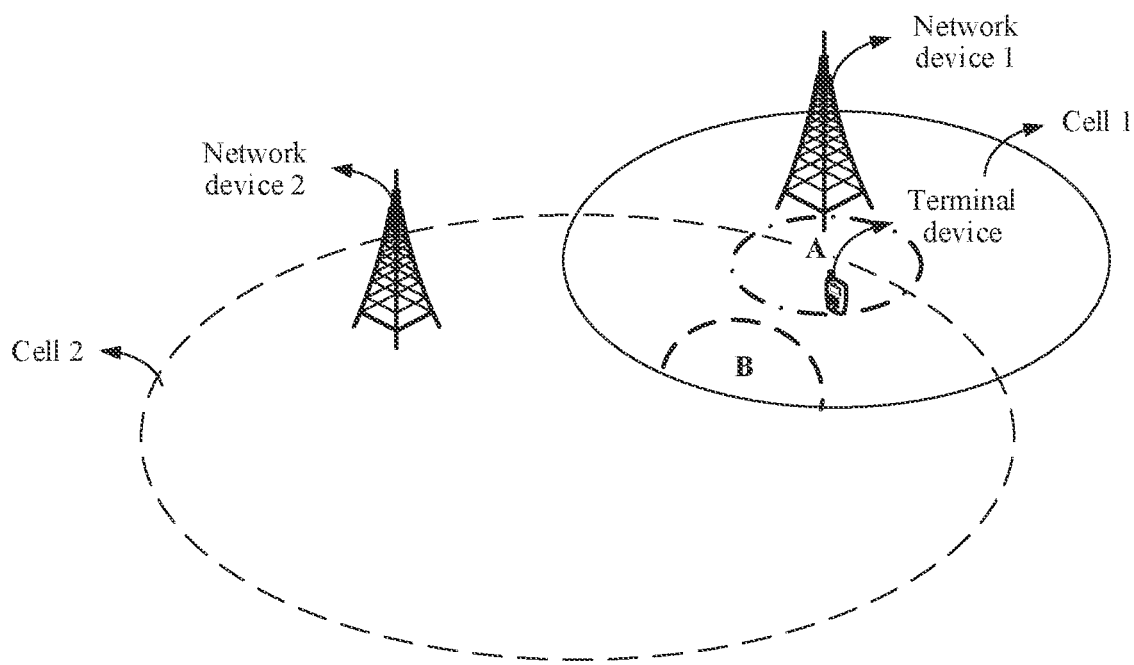

As shown in FIG. 4E, a serving cell in which the terminal device is currently located is a cell 1 in which the network device 1 is located, the terminal device is located at a point A, and a neighboring cell allocated by the network device to the terminal device is a cell 2 in which a network device 2 is located. If the terminal device moves in a circle whose center is the point A and whose radius is 6 meters, and the first range may be set as a circle whose center is the point A and whose radius is 7 meters, it is clearly that a movement range of the terminal device falls within the first range, and it may be considered that a difference between a quality of service reference value that is of the neighboring cell 2 and that has been measured in the movement range or locally stored by the terminal device and a quality of service reference value that is of the neighboring cell 2 and that is measured by the terminal device at any point in the movement range falls within an allowable error range. In this case, both the quality of service reference values are considered to be basically the same. If the terminal device moves within a circle whose center is the point A and whose radius is 10 meters, and the first range may be set as a circle whose center is the point A and whose radius is 7 meters, it is clearly that a movement range of the terminal device partially exceeds the first range, and it may be considered that: When the movement range of the terminal device does not exceed the first range, a difference between a quality of service reference value that is of the neighboring cell and that has been measured or locally stored and a quality of service reference value that is of the neighboring cell and that is temporarily measured by the terminal device falls within an allowable error range. In this case, both the quality of service reference values are considered to be basically the same. When the movement range of the terminal device exceeds the first range, a difference between a quality of service reference value that is of the neighboring cell and that has been measured or locally stored and a quality of service reference value that is of the neighboring cell and that is temporarily measured by the terminal device is relatively large. In this case, both the quality of service reference values cannot be directly considered to be the same.

In FIG. 4E, the first range is in a shape of a circle. Certainly; the first range may alternatively be in another shape. This is not limited in this embodiment of this application. Any manner that can be used to indicate the range is applicable to this embodiment of this application.

A shape or a size of the first range may be determined based on a location of the terminal device and a relative location between the serving cell in which the terminal device is located and the neighboring cell. Different locations of the terminal device correspond to different first ranges. For example, if the terminal device is located in a central area of the serving cell in which the terminal device is located, the corresponding first range may be set to a relatively large range: and if the terminal device is located in an edge area of the serving cell in which the terminal device is located, the corresponding first range may be set to a relatively small range.

As shown in 4F, a serving cell in which the terminal device is currently located is a cell 1 in which the network device 1 is located, a neighboring cell allocated by the network device to the terminal device is a cell 2 in which a network device 2 is located, and the terminal device may be located at a point A and move within a range around the point A, or the terminal device may be located at a point B and move within a range around the point B. The point A is located in a central area of the cell 1, and a relatively large movement range of the terminal device does not cause great impact on a quality of service reference value that is of the neighboring cell and that is measured by the terminal device. Therefore, the first range corresponding to the terminal device at the point A may be a circle whose center is the point A and whose radius is 10 meters. The point B is located in an edge area of the cell 1, and when a movement range of the terminal device is relatively large, the terminal device may move out of the cell 1. This causes great impact on the quality of service reference value that is of the neighboring cell and that is measured by the terminal device. Therefore, the first range corresponding to the terminal device at the point B may be a semicircle whose center is the point B and whose radius is 5 meters.

The first range may be preconfigured by the network device and notified to the terminal device, or may be configured on the terminal device by another device.

A movement status (for example, the movement distance or the movement range) of the terminal device may be detected in a plurality of manners, for example, may be determined by the GPRS server, may be determined by using a sensor disposed on the terminal device, or may be determined through Doppler frequency offset estimation. Any manner that can be used to detect the movement distance of the terminal device is applicable to this embodiment of this application.

The following describes a case in which a movement status of the terminal device is determined by using a sensor disposed on the terminal device or determined through Doppler frequency offset estimation.

Figure 5A:
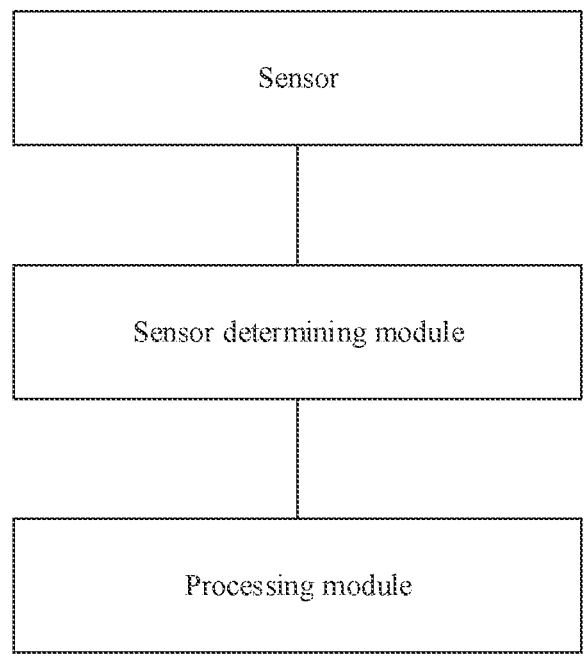
FIG. 5A is a schematic structural diagram of a terminal device according to an embodiment of this application.

FIG. 5A is a schematic structural diagram of the terminal device. The terminal device includes a sensor, a sensor determining module, and a processing module.

The sensor may be an accelerometer (Accelerometer), a barometer, or the like. A movement status of the terminal device, such as a stationary, relatively stationary, walking, riding, or vehicle-mounted state, may be detected by using a specific algorithm, for example, through big data analysis. For example, the sensor determining module determines that the terminal is in the stationary or relatively stationary state (for example, the relatively stationary state means that a movement distance of the terminal device is relatively short and less than the first distance, or a movement range of the terminal device is relatively small and less than the first range). Then, the processing module may perform a corresponding operation, for example, sending the first measurement report, or determining not to send the second measurement report.

The following describes a Doppler estimation manner.

In the Doppler frequency offset estimation method, a correlation between reference signals (or different subframes carrying reference signals) of a cell is used for Doppler frequency offset estimation, and a frequency offset of a reference signal is used to determine a moving speed of the terminal device.

A principle of Doppler frequency offset estimation is that an autocorrelation function is used to satisfy a Bessel function: $R(\tau)=J_0(2\pi f_D\tau)+\sigma^2\delta(t-\tau)$, and $$f_D \propto \frac{R(\tau)}{R(0)-\sigma^2}.$$

Herein, $R(\tau)$ is the autocorrelation function and is used to represent an autocorrelation value between different subframes, $J_0(2\pi f_D\tau)$ is the Bessel function, $\sigma^2\delta(t-\tau)$ is used to represent a noise power value between the different subframes and may reflect a value of a signal-to-noise ratio, $f_D$, represents a Doppler frequency offset, and $\tau$ represents an interval between the different subframes.

Figure 5B:
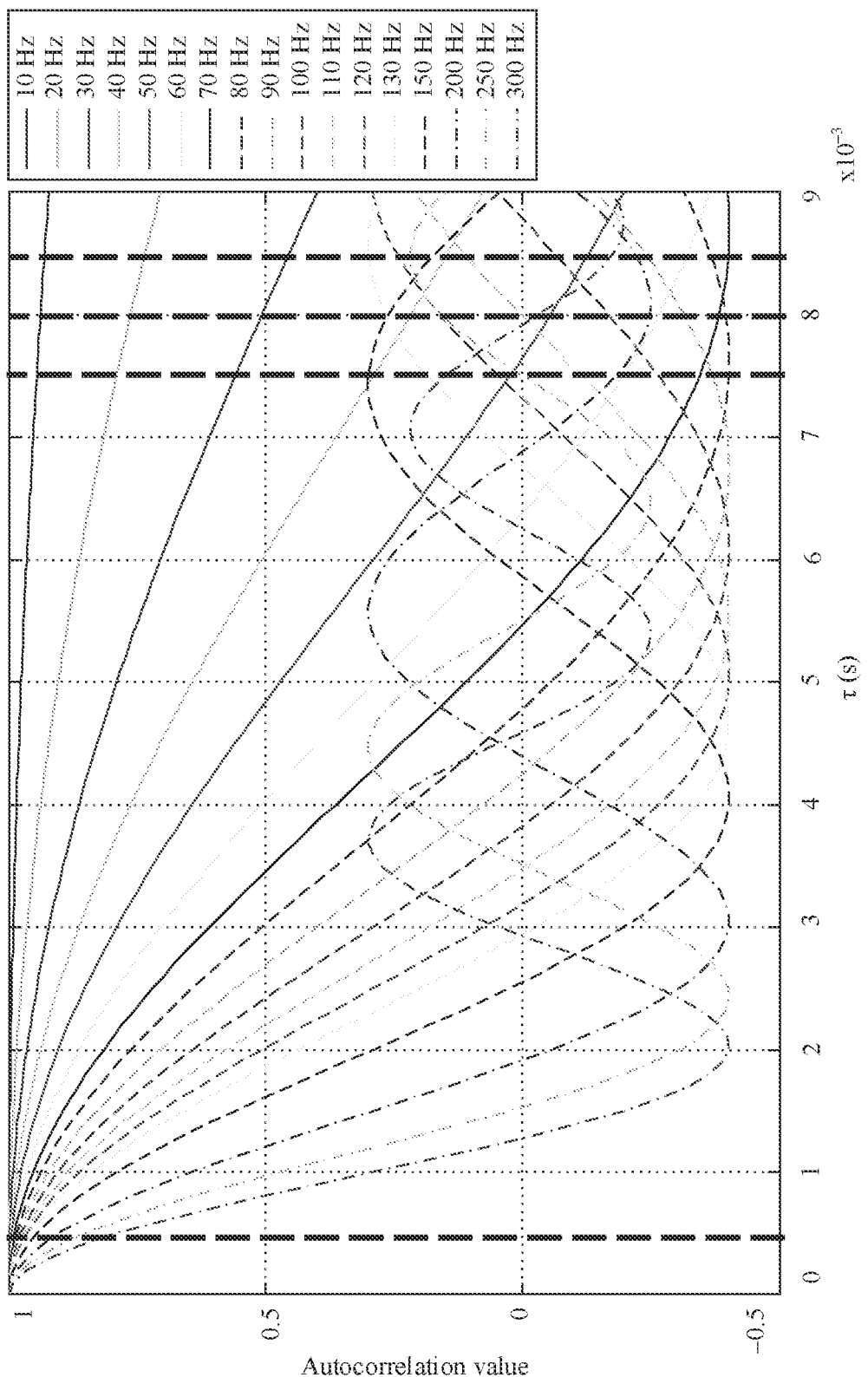
FIG. 5B is a schematic diagram of a relationship between τ and an autocorrelation value according to an embodiment of this application.

FIG. 5B is a schematic diagram of an autocorrelation value between different subframes. Different curves correspond to different Doppler frequency offsets. It can be learned that a larger $\tau$ indicates a larger difference between autocorrelation values corresponding to different Doppler frequency offsets. In other words, a larger $\tau$ leads to higher Doppler frequency offset estimation accuracy. In an actual application, the Doppler frequency offset estimation accuracy should be improved as higher as possible.

In actual application, whether the terminal device moves may be determined independently by using the sensor or through Doppler frequency offset estimation, or may be determined by using a combination of the two manners.

Figures 5C, 6:
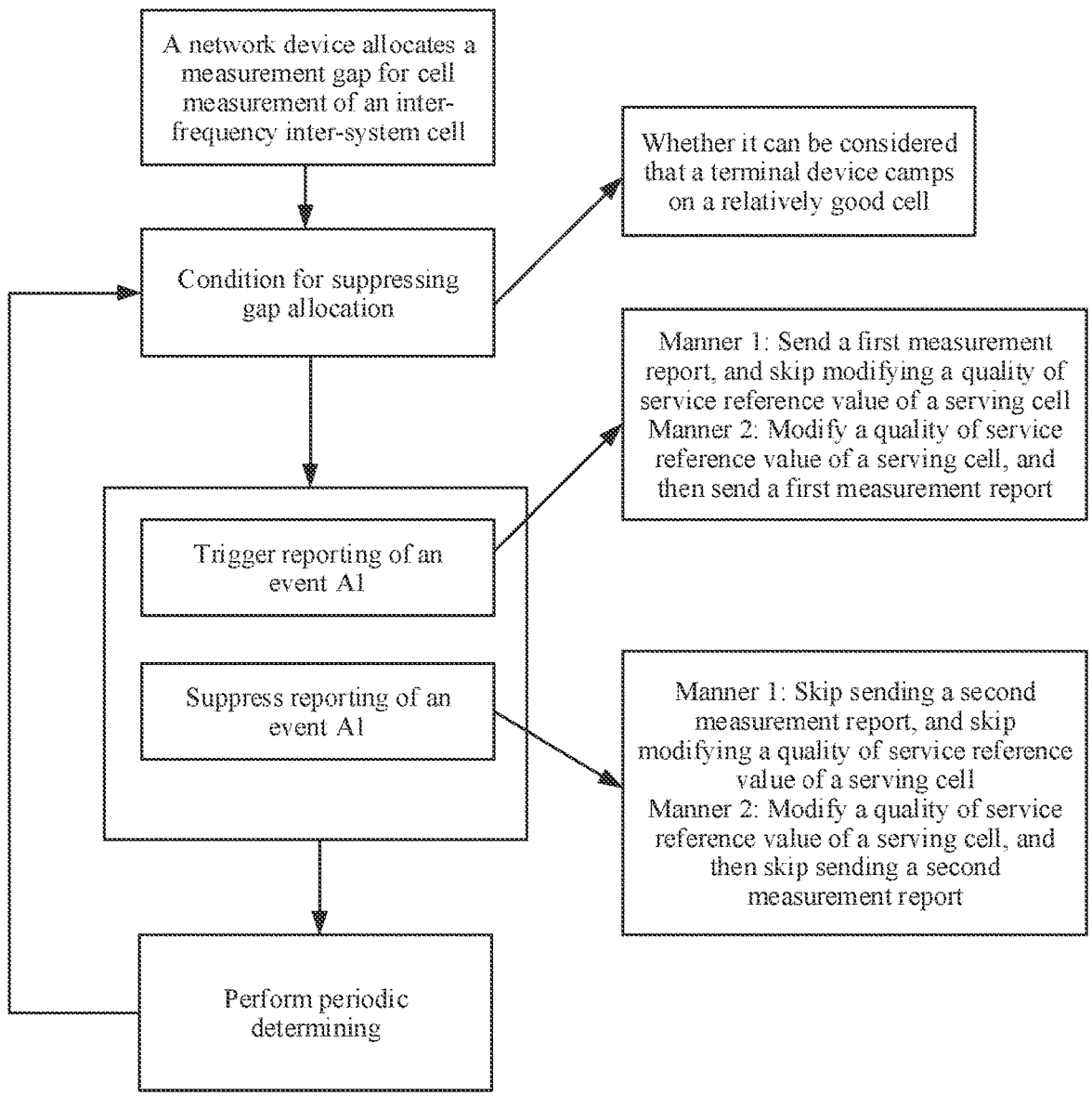
FIG. 5C is a schematic diagram of a relationship between a level and a Doppler frequency offset according to an embodiment of this application.
FIG. 6 is a flowchart of a cell camping method according to an embodiment of this application.

As shown in FIG. 5C, that an interval between subframes is $\tau=1$ ms is used as an example to describe a relationship between a level of Doppler frequency offset estimation and a corresponding frequency offset. An average value of Doppler values corresponding to two consecutive levels is used as a boundary value for differentiation between the levels. For example, an average value 17.5 Hz of 5 Hz and 30 Hz (whether accuracy can reach 0.5 is pending for determining) is used for division between levels 0 and 1. Doppler values less than 17.5 Hz belong to the level 0, and Doppler values greater than 17.5 Hz and less than 45 Hz belong to the level 1.

All the foregoing three conditions relate to the movement status of the terminal device. Alternatively, a condition, for example, the condition 4, may be set based on movement time of the terminal device.

4. The interval between the measurement time point for the locally stored quality of service reference value of the neighboring cell and the current time point is not greater than the first duration.

The terminal device moves for a relatively short time, and correspondingly the terminal device usually has a relatively short movement distance and a relatively small movement range. In this case, a difference between a quality of service reference value that is of a neighboring cell and that has been measured at an original location or locally stored by the terminal device and a quality of service reference value that is of the neighboring cell and that is measured by the terminal device in the first duration in a movement process usually falls within a specific allowable error range, and both the quality of service reference values may be considered to be basically the same.

A value of the first duration may be determined based on a location of the terminal device and a relative location between the serving cell in which the terminal device is located and the neighboring cell. Different locations of the terminal device correspond to different first duration. For example, if the terminal device is located in a central area of the serving cell in which the terminal device is located, the terminal device may move for a relatively long time, and a relatively long movement distance and a relatively large movement range of the terminal device does not cause great impact on the quality of service reference value that is of the neighboring cell and that is measured by the terminal device. In this case, the corresponding first duration may be set to a relatively large value. If the terminal device is located in an edge area of the serving cell in which the terminal device is located, when a movement distance of the terminal device is relatively long and a movement range of the terminal device is relatively large, the terminal device may move out of the serving cell of the terminal device. This causes great impact on the quality of service reference value that is of the neighboring cell and that is measured by the terminal device. In this case, the corresponding first duration may be set to a relatively small value. In the first duration with a relatively small value, the terminal device also has a relatively short movement distance or a relatively small movement range.

As shown in 4D, a serving cell in which the terminal device is currently located is a cell 1 in which the network device 1 is located, a neighboring cell allocated by the network device to the terminal device is a cell 2 in which a network device 2 is located, and the terminal device may be located at a point A. or may be located at a point B. The point A is located in a central area of the cell 1, and a relatively long movement time of the terminal device does not cause great impact on a quality of service reference value that is of the neighboring cell and that is measured by the terminal device. Therefore, the first duration corresponding to the terminal device at the point A may be set to 10 minutes. The point B is located in an edge area of the cell 1, and when the terminal device moves for relatively long duration, the terminal device may move out of the cell 1. This causes great impact on the quality of service reference value that is of the neighboring cell and that is measured by the terminal device. Therefore, the first duration corresponding to the terminal device at the point B may be set to 5 minutes.

It should be noted that a specific form of the preset condition is not limited in this embodiment of this application. Any condition that can represent that the movement range of the terminal device does not cause impact on the measured quality of service reference value of the neighboring cell is applicable to this embodiment of this application.

In the foregoing descriptions of the four conditions, a manner for the terminal device to obtain the neighboring cell is not limited. For example, the terminal device may obtain information about a neighboring cell from the network device, for example, may send the second measurement report: or may query for a quality of service reference value that is of a neighboring cell and that has been measured and locally stored. It should be noted that a quantity of neighboring cells is not limited in this embodiment of this application. The network device may allocate one or more neighboring cells to the terminal device based on the location of the terminal device.

In another possible implementation, after obtaining the information about the neighboring cell from the network device, the terminal device may not determine whether the terminal device locally stores a quality of service reference value that is of the neighboring cell and that has been previously measured by the terminal device, but directly measure a quality of service reference value of the neighboring cell. For a manner for the terminal device to measure the quality of service reference value of the neighboring cell, refer to the manner for the terminal device to measure the quality of service reference value of the serving cell. Details are not described herein again. After the measurement, the terminal device may determine a relationship between the quality of service reference value of the current neighboring cell and the quality of service reference value of the serving cell, and further determine a cell with a higher quality of service reference value from the serving cell and the neighboring cell.

If the quality of service reference value of the neighboring cell is not greater than the quality of service reference value of the serving cell, it indicates that the quality of service reference value of the serving cell is a cell currently having a relatively high quality of service reference value. In this case, the terminal device may still camp on the serving cell, and does not need to be handed over from the serving cell to another cell.

The terminal device may prevent, in the following several manners, the network device from continuing to allocate a neighboring cell and a measurement gap to the terminal device:

Manner 1: The terminal device sends the first measurement report to the network device, where the first measurement report is used to notify the network device that the quality of service reference value of the serving cell is greater than the first threshold. For example, the first measurement report may carry the quality of service reference value of the serving cell. After receiving the first measurement report, the network device may determine that the quality of service reference value of the serving cell is relatively high, and does not allocate a measurement gap and a neighboring cell to the terminal device.

Because the quality of service reference value that is of the serving cell and that is actually measured by the terminal device is not greater than the first threshold, the terminal device may modify the quality of service reference value of the serving cell in the first measurement report, where a modified quality of service reference value of the serving cell should be greater than the first threshold.

After receiving the first measurement report, the network device may not detect whether the quality of service reference value of the serving cell in the first measurement report is greater than the first threshold. Instead, the network device determines, only based on a message type of the first measurement report or a flag bit in the first measurement report, that a received measurement report is the first measurement report that is used to notify the network device that the quality of service reference value of the serving cell is greater than the first threshold. Alternatively, the terminal device may not modify the quality of service reference value of the serving cell in the first measurement report.

Manner 2: The terminal device may not send the second measurement report to the network device, where the second measurement report is used to notify the network device that the quality of service reference value of the serving cell is less than the first threshold. The network device does not receive the second measurement report, and therefore considers by default that the terminal device is currently located in the serving cell with a relatively high quality of service reference value.

For example, after measuring the quality of service reference value of the serving cell, the terminal device may modify the quality of service reference value of the serving cell, so that a modified quality of service reference value of the serving cell is not less than the first threshold; and the terminal device may further determine not to send the second measurement report. Alternatively, the terminal device may not modify the quality of service reference value of the serving cell, but directly suppress sending of the second measurement report, namely, skip reporting the event A2.

As shown in FIG. 6, when the network device allocates a measurement gap (gap) that is required for configuring cell measurement of an inter-frequency inter-system cell for the terminal device, the terminal device may determine whether a condition for suppressing gap allocation (namely, the preset condition in this embodiment of this application) is met, whether it can be considered that the terminal device camps on a relatively good cell if the terminal device has a relatively short movement distance or a relatively small movement range, and how to enable suppression of gap allocation or cell measurement when the preset condition is met. Specifically, the terminal device may trigger reporting of the event A1, or suppress reporting of the event A2.

When reporting of the event A1 is triggered, Manner 1 may be sending the first measurement report and skipping modifying the quality of service reference value of the serving cell carried in the first measurement report, and Manner 2 is directly modifying the quality of service reference value of the serving cell, so that a condition for reporting the event A1 is met, the quality of service reference value of the serving cell is greater than the first threshold, and the first measurement report is sent.

When reporting of event A2 is suppressed, Manner 1 is skipping sending the second measurement report, and Manner 2 may be directly modifying the quality of service reference value of the serving cell, so that a condition for skipping reporting the event A2 is met, the quality of service reference value of the serving cell is less than the first threshold, and the second measurement report is not sent.

The terminal device may periodically determine whether the condition for suppressing gap allocation is met.

Different terminal devices have different performance, and therefore cell measurement manners may be different. For example, some terminal devices have a dual-frequency receiving capability. In other words, when performing cell measurement on an inter-frequency intra-system cell, some terminal devices do not require the network device to allocate a measurement gap. The terminal devices can still perform measurement on the inter-frequency intra-system cell when there is no measurement gap. In this case, if the terminal device reports the event A2, the terminal device performs cell measurement on some inter-frequency intra-system cells without a measurement gap (for ease of description, an inter-frequency intra-system cell on which the terminal device can perform cell measurement even if there is no measurement gap is referred to as a first inter-frequency intra-system cell, and an inter-frequency intra-system cell on which the terminal device can perform cell measurement only when there is a measurement gap is referred to as a second inter-frequency intra-system cell).

In this case, a terminal device having a dual-frequency receiving capability may also report the event A2, and the network device allocates a neighboring cell. If the neighboring cell allocated by the network device includes a first inter-frequency intra-system cell, the terminal device may perform cell measurement on the first inter-frequency intra-system cell. For a cell (for example, the inter-frequency intra-system cell) that is other than the first inter-frequency intra-system cell in the neighboring cells allocated by the network device and that requires a measurement gap for cell measurement, the terminal device may further report the event A1 after reporting the event A2, to prevent the network device from allocating a measurement gap.

In addition to the foregoing two manners, the following Manner 3 and Manner 4 may alternatively be used:

Manner 3: The terminal device may send a first message to the network device, where the first message is used to indicate that the terminal device meets the preset condition.

In this manner, the terminal device may send the second measurement report to the network device. After receiving the first message and the second measurement report, the network device may determine that the terminal device meets the preset condition, in other words, the terminal device does not move in a relatively large range or move a relatively long distance (for example, exceeding the first range or exceeding the first distance), the network device may consider that the terminal device currently camps on a relatively good cell and requires no cell handover, and the network device may not allocate a neighboring cell and the measurement gap to the terminal device.

In a possible implementation, an allocation policy may be configured for the network device, and the allocation policy indicates whether to allocate the neighboring cell and the measurement gap to the terminal device when the terminal device meets the preset condition.

The network device may determine, based on the first message and according to the allocation policy, whether to allocate the neighboring cell and the measurement gap to the terminal device.

For example, the first message may carry location information of the terminal device. If the allocation policy may indicate that the terminal device meets the preset condition, and a distance from the terminal device to the edge area of the serving cell is greater than a first value, the network device does not need to allocate the neighboring cell and the measurement gap to the terminal device. In this case, the network device may determine, based on the location information of the terminal device, whether the distance from the terminal device to the edge area of the serving cell is greater than the first value. Alternatively, if the allocation policy may indicate that the terminal device meets the preset condition, and a distance from the terminal device to the edge area of the serving cell is less than a first value and greater than a second value, the network device does not need to allocate the neighboring cell and the measurement gap to the terminal device. In this case, the network device may determine, based on the location information of the terminal device, that the distance from the terminal device to the edge area of the serving cell is less than the first value and greater than the second value. The foregoing indication manners of the allocation policy are merely used as examples, and specific content of the allocation policy is not limited in this embodiment of this application. Any allocation policy that can be used to determine, based on the first message, not to allocate the neighboring cell and the measurement gap to the terminal device is applicable to this embodiment of this application.

In addition to the foregoing three manners, other manners are also not limited in this embodiment of this application. For example, the terminal device may send the second measurement report to the network device. If the network device allocates the neighboring cell and the measurement gap to the terminal device, after obtaining the neighboring cell and the measurement gap from the network device, the terminal device may not perform cell measurement. This also can reduce power consumption of the terminal device.

In the manner in which the first measurement report is sent to the network device, a second threshold may be set. For example, the second threshold may be an S measurement value (s-Measure), and the second threshold may be configured by the network device, or may be configured by the terminal device. The second threshold is greater than the first threshold.

The first threshold and the second threshold have the following difference:

The second threshold is a threshold used by the terminal device to determine whether to enable cell measurement of an intra-frequency cell, an inter-frequency cell, or an inter-system cell, whereas the first threshold is a threshold used by the terminal device to determine whether to enable cell measurement of an inter-frequency cell or an inter-system cell.

In other words, if the quality of service reference value of the serving cell is greater than the second threshold, the terminal device may send a third measurement report, to notify that the quality of service reference value of the serving cell is greater than the second threshold. The network device stops allocating information required for measurement of any neighboring cell (for example, a measurement gap), where the information required for measurement of any neighboring cell includes information required for measurement of the intra-frequency cell. If the quality of service reference value of the serving cell is less than the second threshold and greater than the first threshold, the terminal device sends the first measurement report, to trigger the terminal device to enable cell measurement of the inter-frequency cell or the inter-system cell.

If the quality of service reference value of the serving cell is less than the second threshold, to reduce power consumption caused by cell measurement, the terminal device may send the third measurement report, and the network device considers that the terminal device has camped on a relatively good cell, and does not allocate a measurement gap.

In the foregoing embodiments, the terminal device needs to determine the quality of service reference value of the serving cell and the quality of service reference value of the neighboring cell. In a possible implementation, the terminal device may not determine the quality of service reference value of the serving cell and the quality of service reference value of the neighboring cell. Instead, the terminal device determines whether the serving cell can meet a service requirement of the terminal device. For example, the terminal device may detect whether a service of the terminal device is interrupted, or detect whether communication of the terminal device is normal. The foregoing manner of determining whether the serving cell can meet the service requirement of the terminal device is merely used an example for description. Any manner that can be used to detect a service status of the terminal device to determine that the serving cell meets the service requirement of the terminal device is applicable to this embodiment of this application.

When the terminal device determines that the serving cell can meet the service requirement of the terminal device, the terminal device may not request the neighboring cell and the measurement gap from the network device. For example, the terminal device may send the first measurement report or not trigger the second measurement report, or may not perform cell measurement.

Figure 7:
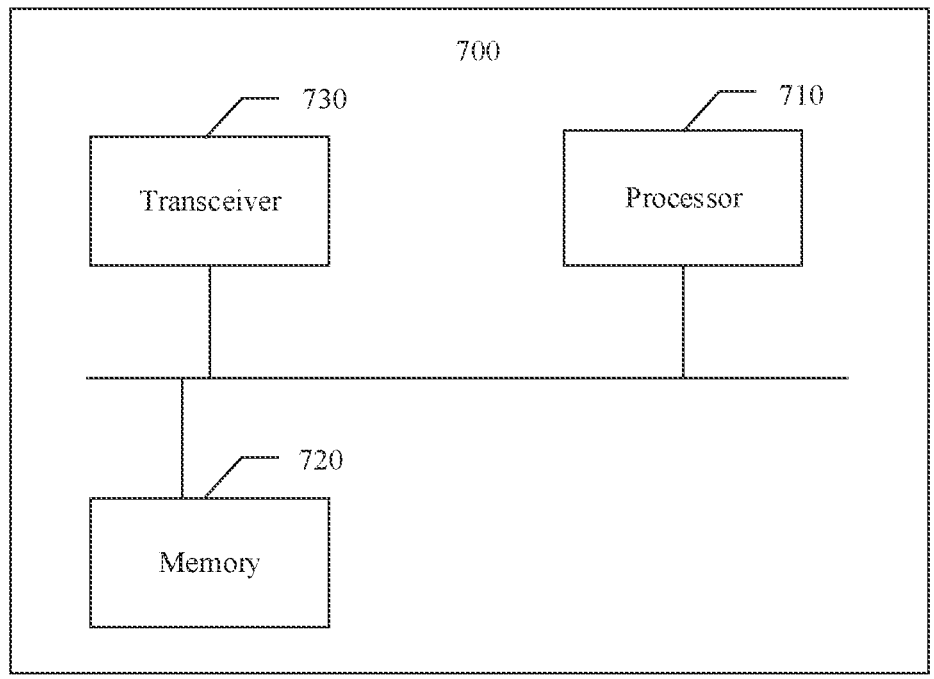
FIG. 7 is a schematic structural diagram of a terminal device according to an embodiment of this application.

Based on a same inventive concept, FIG. 7 shows a terminal device 700 according to this application. The electronic device 700 includes at least one processor 710 and at least one memory 720. The processor 710 is coupled to the memory 720. The coupling in this embodiment of this application is an indirect coupling or a communication connection between apparatuses, units, or modules, and may be in an electrical, mechanical, or another form, and is used for information exchange between the apparatuses, units, or modules.

The processor 710 may have a data sending and receiving function, and can communicate with another device. In the apparatus in FIG. 7, an independent data sending and receiving module, for example, a transceiver 730, may be disposed, and is configured to send and receive data. When communicating with the another device, the processor 710 may transmit data by using the transceiver 730. For example, the transceiver 730 may be configured to send the first measurement report and the first message.

The memory 720 stores related data such as code instructions. The processor 710 is configured to invoke the related data such as the code instructions stored in the memory 720, to perform the cell camping method provided in the embodiments of this application: for example, selecting a cell whose quality of service reference value is highest from cells found by the terminal device as a first cell for current camping: and when a quality of service reference value of the first cell is less than a first threshold, reporting an event A 1 or determining not to report an event A2.

It should be understood that the terminal device 700 may be configured to implement the cell camping method in the embodiments of this application. For a related feature, refer to that in the method part. Details are not described herein again.

Figure 8:
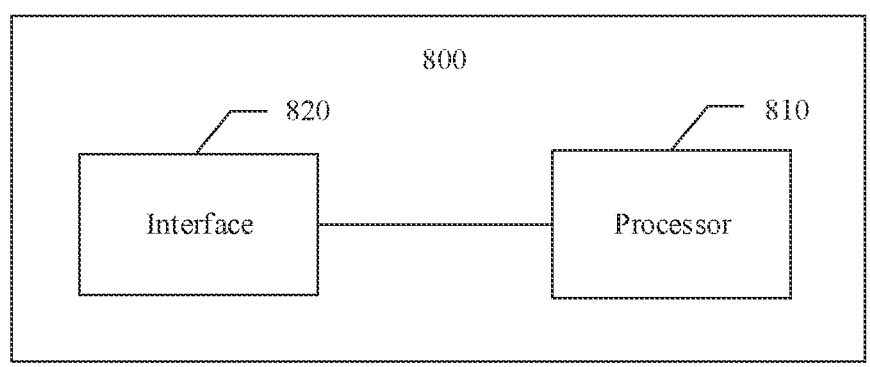
FIG. 8 is a schematic structural diagram of a chip according to an embodiment of this application.

For example, as shown in FIG. 8, this application provides a chip 800. The chip 800 includes at least one processor 810 and interface 820. The interface 820 is configured to: receive code instructions, and send the received code instructions to the processor 810. The processor 810 runs the received code instructions sent by the interface, to perform the cell camping method in the embodiments of this application. For a specific cell camping method, refer to descriptions m the method embodiments. Details are not described herein again.

A person of ordinary skill in the art may clearly know that the embodiments of this application may be implemented by hardware, firmware, or a combination thereof. When the embodiments of this application are implemented by software, the foregoing functions may be stored in a computer-readable medium or transmitted as one or more instructions or code in a computer-readable medium. The computer-readable medium includes a computer storage medium and a communications medium, where the communications medium includes any medium that facilitates transmission of a computer program from one place to another. The storage medium may be any available medium that can be accessed by a computer. The computer-readable medium may include, by way of example but not limitation, a RAM, a ROM, an electrically erasable programmable read-only memory (electrically erasable programmable read-only memory, EEPROM), a compact disc read-only memory (compact disc read-Only memory, CD-ROM) or another compact disc storage, a magnetic disk storage medium or another magnetic storage device, or any other medium that can be configured to carry or store desired program code in a form of an instruction or a data structure and that can be accessed by a computer. In addition, any connection may be appropriately defined as a computer-readable medium. For example, if software is transmitted from a website, a server, or another remote source by using a coaxial cable, an optical fiber and optical cable, a twisted pair, a digital subscriber line (digital subscriber line, DSL), or wireless technologies such as infrared, radio, and microwave, the coaxial cable, the optical fiber and optical cable, the twisted pair, the DSL, or the wireless technologies such as infrared, radio, and microwave are included in a definition of a medium to which the coaxial cable, the optical fiber and optical cable, the twisted pair, the DSL, or the wireless technologies such as the infrared ray, the radio, and the microwave belong. For example, a disk (disk) and a disc (disc) that are used in the embodiments of this application include a compact disc (compact disc, CD), a laser disc, an optical disc, a digital video disc (digital video disc, DVD), a floppy disk, and a Blu-ray disc. The disk usually magnetically copies data, and the disc optically copies data in a laser manner. A combination of the foregoing items shall also be included in the protection scope of the computer-readable medium.

In conclusion, what is described above is merely embodiments of this application, but is not intended to limit the protection scope of this application. Any modification, equivalent replacement, or improvement made according to the disclosure of this application shall fall within the protection scope of this application.

What is claimed is:

1. A terminal device comprising:
 a non-volatile memory configured to store program instructions; and
 one or more processors coupled to the memory, wherein the program instructions instruct the one or more processors to cause the terminal device to:
  select a quality of service reference value of a first cell, wherein the quality of service reference value comprises a signal delay;

select the first cell for current camping, wherein the quality of service reference value of the first cell is highest among a plurality of found cells; and when the quality of service reference value of the first cell is less than a first threshold, send a first measuring report or determine not to send a second measuring report.

2. The terminal device of claim 1, wherein the first threshold further comprises a power level of −90 decibel-milliwatts (dBm) to −105 dBm.

3. The terminal device of claim 1, wherein the instructions further instruct the one or more processors to cause the terminal to, before sending the first measuring report or determining not to send the second measuring report, determine that a preset condition is met, wherein the preset condition indicates, to the terminal device, that the first cell quality of service reference value of the first cell is highest among the cells found by the terminal device.

4. The terminal device of claim 3, wherein the preset condition comprises:
the terminal device is located in a first area;
a movement distance of the terminal device is not greater than a first distance;
a movement range of the terminal device falls within a first range; or
an interval between a measurement time point for a locally stored quality of service reference value of a neighboring cell and a current time point is not greater than first duration.

5. The terminal device of claim 1, wherein the instructions further instruct the one or more processors to cause the terminal to stop cell measurement when the quality of service reference value of the first cell is less than the first threshold.

6. The terminal device of claim 1, wherein the first measuring report comprises notification that the quality of service reference value of the first cell is greater than the first threshold.

7. The terminal device of claim 1, wherein the sending the first measurement report further comprises:
modifying the quality of service reference value of the first cell to a modified quality of service reference value that is greater than the first threshold; and
sending the first measurement report comprising the modified quality of service reference value of the first cell.

8. The terminal device of claim 1, wherein the second measurement report is formatted to notify a network device that the quality of service reference value of the first cell is less than the first threshold.

9. The terminal device of claim 3, wherein the instructions further instruct the one or more processors to cause the terminal to send a first message when the quality of service reference value of the first cell is less than the first threshold, wherein the first message indicates that the terminal device meets the preset condition.

10. The terminal device of claim 9, wherein the first message comprises location information of the terminal device.

11. A cell camping method, comprising:
selecting a quality of service reference value of a first cell, wherein the quality of service reference value comprises a level of signal jitter;
selecting, by a terminal device, from a plurality of cells found by the terminal device, a first cell for current camping, wherein a quality of service reference value of the first cell is highest among a plurality of cells; and sending, by the terminal device, a first measuring report or determining not to send a second measuring report when the quality of service reference value of the first cell is less than a first threshold.

12. The method of claim 11, before the sending, by the terminal device, the first measuring report or determining not to send the second measuring report, the method further comprises determining, by the terminal device, that a preset condition is met, wherein the preset condition indicates, to the terminal device, that the quality of service reference value of the first cell is highest among the cells found by the terminal device.

13. The method of claim 12, wherein the preset condition comprises:
the terminal device is located in a first area;
a movement distance of the terminal device is not greater than a first distance;
a movement range of the terminal device falls within a first range; or
an interval between a measurement time point for a locally stored quality of service reference value of a neighboring cell and a current time point is not greater than first duration.

14. The method of claim 11, wherein when the quality of service reference value of the first cell is less than the first threshold, the method further comprises stopping, by the terminal device, cell measurement.

15. The method of claim 11, wherein the first measurement report is configured to notify a network device that the quality of service reference value of the first cell is greater than the first threshold.

16. The method of claim 15, wherein the sending, by the terminal device, a first measurement report comprises:
modifying, by the terminal device, the quality of service reference value of the first cell, wherein a modified quality of service reference value of the first cell is greater than the first threshold; and
sending, by the terminal device, the first measurement report comprising the modified quality of service reference value of the first cell.

17. The method of claim 11, wherein the second measurement report is formatted to notify a network device that the quality of service reference value of the first cell is less than the first threshold.

18. The method of claim 12, wherein when the quality of service reference value of the first cell is less than the first threshold, the method further comprises sending, by the terminal device, a first message, wherein the first message comprises an indication that the terminal device meets the preset condition.

19. The method of claim 18, wherein the first message comprises location information of the terminal device.

20. A semiconductor chip comprising:
one or more processors; and
an interface coupled to the one or more processors, wherein the interface is configured to:
receive program instructions, and
send the instructions to the processor,
wherein the one or more processors is configured to execute the instructions to:
select a quality of service reference value of a first cell, wherein the quality of service reference value comprises a packet loss rate or a signal bit error rate;
select a first cell for current camping, wherein a quality of service reference value of the first cell is highest among cells found by a terminal device; and when the quality of service reference value of the first cell is less than a first threshold, cause the terminal device to send a first measuring report or determine not to send a second measuring report.

* * * * *

UNITED STATES PATENT AND TRADEMARK OFFICE
CERTIFICATE OF CORRECTION

| | | |
|---|---|---|
| PATENT NO. | : 11,997,553 B2 | Page 1 of 1 |
| APPLICATION NO. | : 17/431583 | |
| DATED | : May 28, 2024 | |
| INVENTOR(S) | : Delai Zheng et al. | |

It is certified that error appears in the above-identified patent and that said Letters Patent is hereby corrected as shown below:

In the Claims

Claim 3, Column 25, Lines 16-17: "that the first cell quality of" should read "that the quality of"

Signed and Sealed this
Ninth Day of July, 2024

Katherine Kelly Vidal
*Director of the United States Patent and Trademark Office*